April 13, 1965 R. H. WISE 3,177,514
WINDSHIELD WIPER
Filed Nov. 22, 1963 3 Sheets-Sheet 1
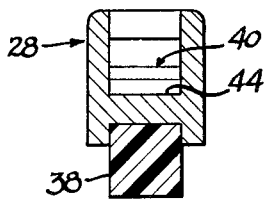
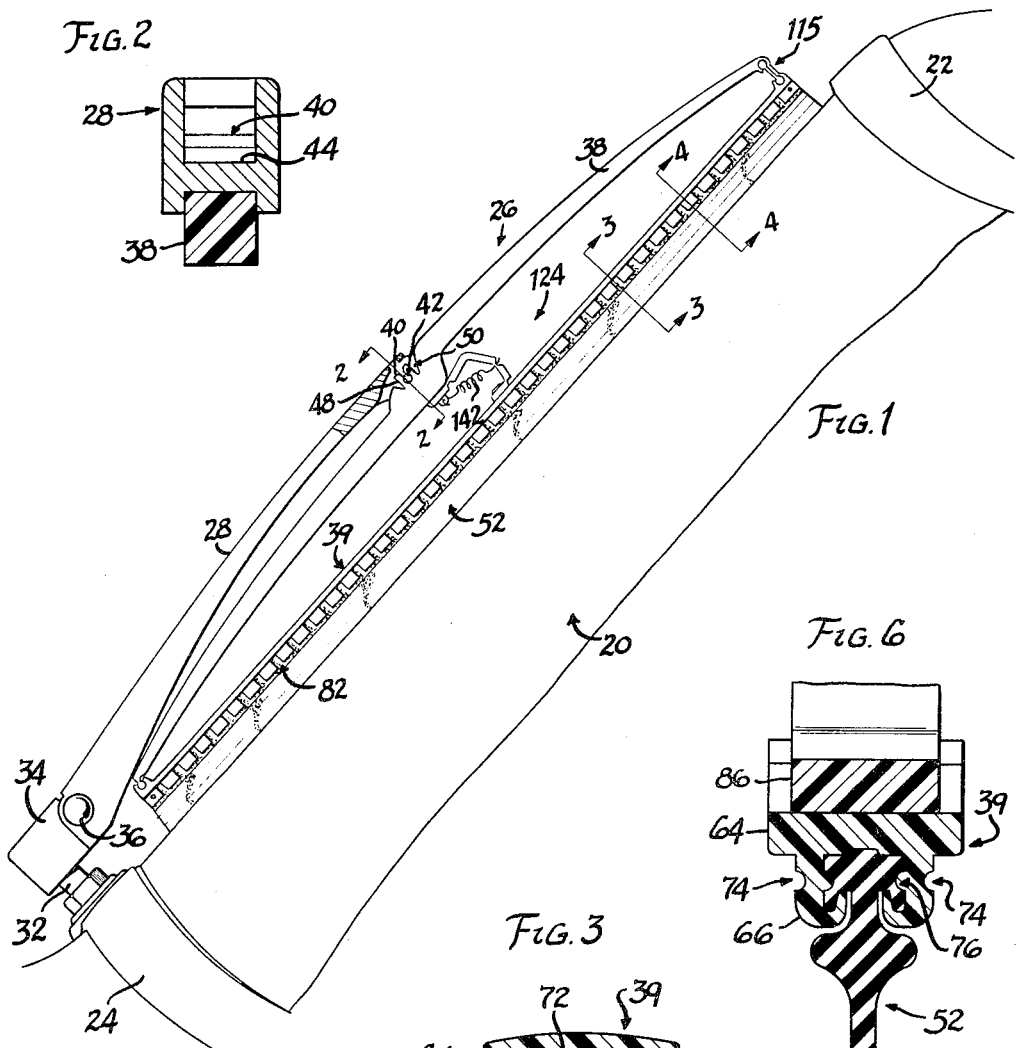
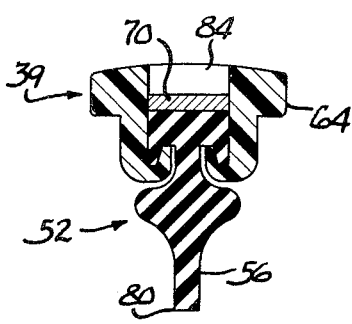
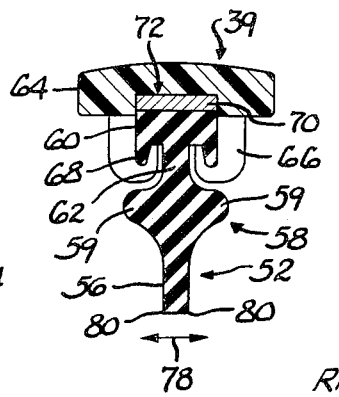
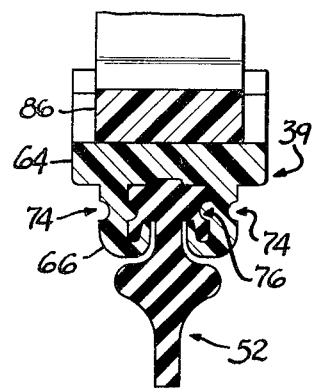
INVENTOR.
RALPH H. WISE
BY
WILSON, SETTLE & CRAIG
ATTORNEYS

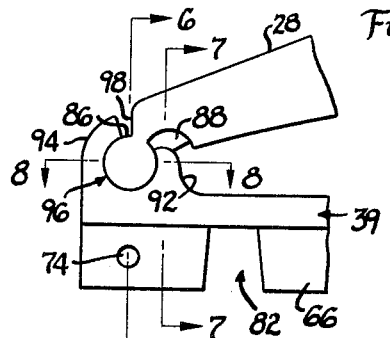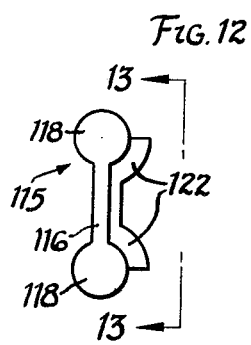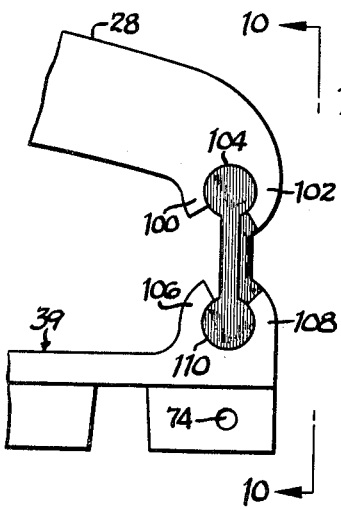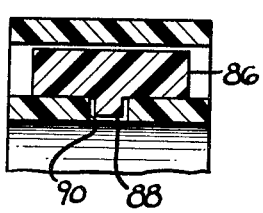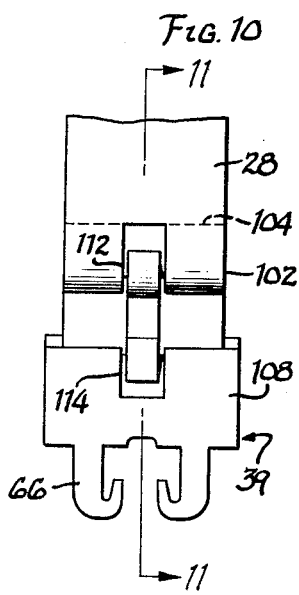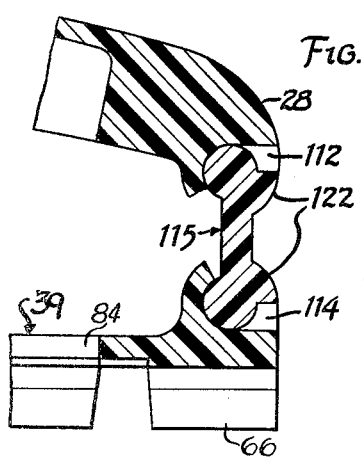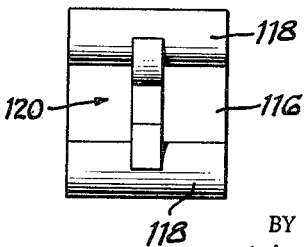

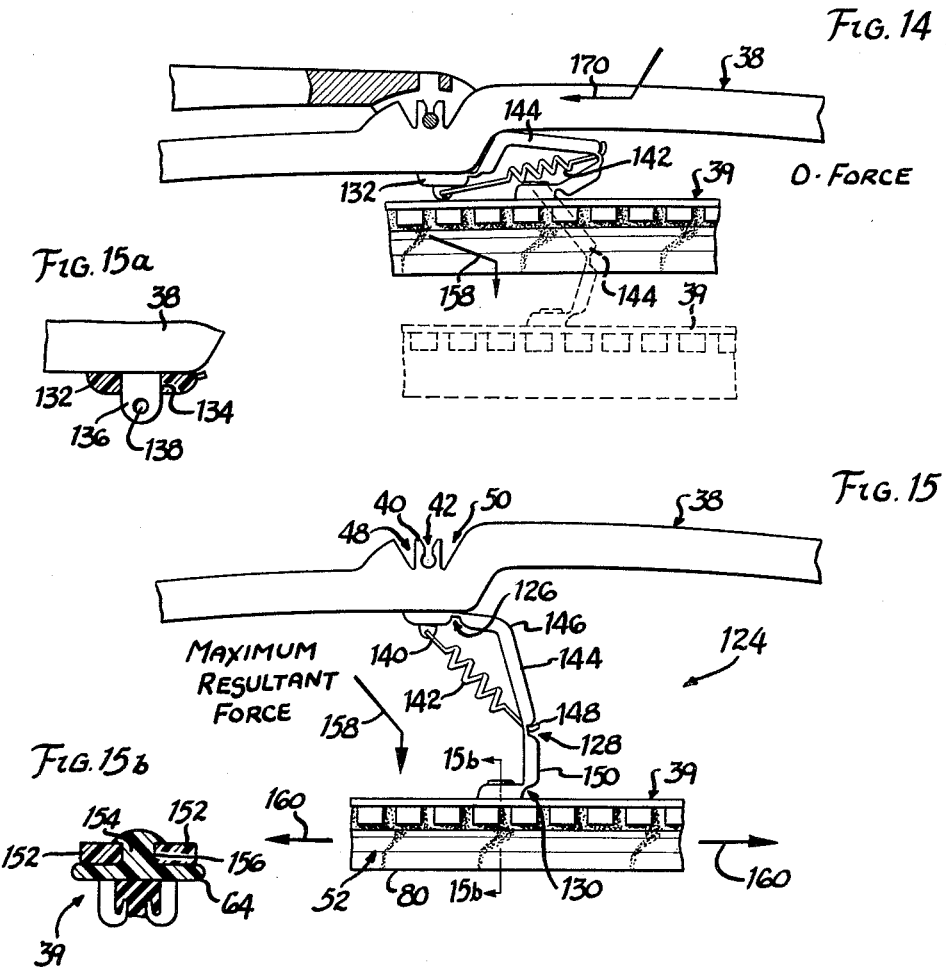
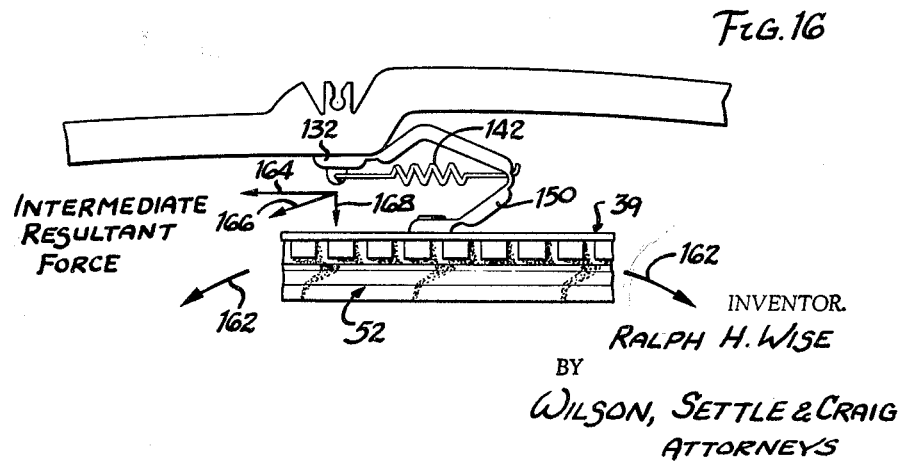

United States Patent Office 3,177,514
Patented Apr. 13, 1965

3,177,514
WINDSHIELD WIPER
Ralph H. Wise, 26235 W. Warren Ave., Dearborn, Mich.
Filed Nov. 22, 1963, Ser. No. 325,575
10 Claims. (Cl. 15—250.42)

This invention relates to windshield wipers of the bow-type, that is, where the wiping element or blade is supported at its ends only, and more particularly to windshield wiper constructions of the bow-type wherein a novel central pressure member between the bow and the blade carrier provides resultant forces on median portions of the blade that are automatically compensated to and by the curvature of the instant surface being wiped.

*The prior art and the problems thereof*

As is well known, present day automobile windshields, and as well, those of other vehicles such as boats, airplanes, and the like, are larger than the old flat windshields. They are also substantially curved across their entire width. In the central portions, the curve is rather uniform and relatively flat to give good forward viewing for the operator of the vehicle. However, at the ends, sharper curves are encountered where the ends cut back. These end portions blend into the sides of the vehicle to give smooth aerodynamic lines. Also, the top central portion slopes back in a compound curve. The purpose of the greater glass area of course is to provide additional visibility. The additional visibility is supposedly brought about by the fact that the corner posts or end posts supporting the windshield are moved back to remove the former blind spots.

It will be evident from the foregoing that these present windshields are of compound curvature and present a very difficult surface to wipe clean, all of course without skips. This is indeed a challenge when it is understood that materials such as rain, snow, and the like, must be removed under conditions of high winds such as encountered when a vehicle is moving through the air, along the ground, or over water at speeds of up to 100 m.p.h. and higher.

In order that a reasonable area of such windshields be wiped relatively clean, the prior art has relied upon very complicated wiper assemblies. These have included various compression loading structures such as whiffle trees, biasing springs and the like. Such components have been used in an attempt to transmit the forces of the wiper arm into the wiper blade along its entire length and wrap the compound curves. Thus, the prior devices have attempted to force the wiping edge into conforming contact with the windshield by spreading a single compression load from the wiper arm to spaced portions of the wiping element through at least two whiffle trees and their complex force-distribution arrangements.

However, as is well known, these prior structures have not fully wiped the area traversed by the blade. They have left skips and uncleared places at the ends of the windshield. Further, these prior structures have not fully wrapped the sharp breaking curves at those areas of the windshield. The result has been that the additional visibility supposedly provided by the increased glass area of the larger more complex windshields has been largely nullified by the loss in wiping effectiveness at these sharply curving areas.

Further, the structures of the prior art have been extensively complicated with many moving parts, all of which are subject to clogging and jamming by snow and the like. Further, all of these many parts are exposed to the weather and corrode and become non-functional in a relatively short period of time.

Accordingly, a substantial advance to the art would be provided by a unique approach to the wiping of windshields, wherein the number of parts in a windshield wiper assembly are reduced to essentially two, namely, a bow and a carrier-wiping edge assembly; and wherein a novel center loading mechanism is employed to bias the central portions of the wiping edge into contact with the windshield under automatically compensating pressure directly related to the particular curvature being traversed so that full and effective wrap is provided.

*Objects*

It is, therefore, an important object to provide an improved windshield wiper assembly having a wiping edge capable of instant and accurate conformation to a curved surface of changing complexity of curvature.

Another important object resides in the provision of a windshield wiper blade having improved conformation or wrap, but supported against torsional deformation by a novel anti-rotate wiping edge carrier that is not longitudinally tensioned as in the prior art.

Another object is to provide a windshield wiper assembly wherein the blade is more uniformly conformed to an arcuate surface, but without harsh reactions being developed, so that the applied loading is gently reduced at the center as the edge is more sharply curved, providing improved wrap of sharp curvatures.

A further important object is to provide a bow-type wiper construction embodying the above objective features, wherein the bow is connected to the ends only of the blade carrier by a unique floating arrangement.

A further object is to provide a novel bow-type wiper construction comprising automatically compensating loading means at the center to uniformly urge the wiping edge against the windshield surface, but without harshly stressing or longitudinally tensioning it; thereby improving conformance to and wrap of a sharply curved surface.

A further object is to provide a novel bow-type windshield wiper wherein the center loading is compensated automatically by the curvature which the wiping edge is instantly traversing so that the sharper the curvature the lighter the loading, permitting complete end conformance and full wrap by the blade as distinguished from the skips of the prior art structures.

A further object is to provide a novel windshield wiper construction that is injection molded of synthetic resin and thus capable of mass production on an economical basis.

Other objects of this invention will appear in the following description and appended claims, reference being had to the accompanying drawings forming a part of this specification wherein like reference characters designate corresponding parts in the several views.

In the drawings:

FIGURE 1 is a side elevational view, about half size, of a windshield wiper of invention as positioned upon a vehicle windshield;

FIGURE 2 is an enlarged sectional view taken along line 2—2 of FIGURE 1;

FIGURE 3 is an enlarged sectional view taken along line 3—3 of FIGURE 1;

FIGURE 4 is an enlarged sectional view taken along the line 4—4 of FIGURE 1;

FIGURE 5 is an enlarged fragmentary side elevational view of the inner end bow-wiper carrier pivot connection;

FIGURE 6 is a sectional view taken along line 6—6 of FIGURE 5;

FIGURE 7 is a sectional view taken along line 7—7 of FIGURE 5;

FIGURE 8 is a sectional view taken along line 8—8 of FIGURE 5;

FIGURE 9 is an enlarged fragmentary, side elevational view of the outer end bow-carrier floating pivotal connection;

FIGURE 10 is an elevational view taken along line 10—10 of FIGURE 9;

FIGURE 11 is a sectional view taken along line 11—11 of FIGURE 10;

FIGURE 12 is a side elevational view of the connecting link of FIGURE 9;

FIGURE 13 is an elevational view taken along line 13—13 of FIGURE 12;

FIGURE 14 is a fragmentary side elevational view approximately full scale of the central loading mechanism illustrating both sharp and flat curve positions of the wiper blade and resultant forces developed;

FIGURE 15 is a view similar to FIGURE 14 but showing only the flat curve position and the resultant forces involved;

FIGURE 15a is a fragmentary sectional view illustrating the connection between the bow and one end of the loading hinge arm;

FIGURE 15b is a fragmentary sectional view illustrating the connection between the carrier and the other end of the loading hinge arm; and FIGURE 16 is a view similar to FIGURES 14 and 15, and illustrating only the sharp curve position and the resultant forces involved.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*Perspective view*

The present invention proposes a new and simplified approach to efficiently wiping a windshield surface of compound curvature. This new approach rejects the prior complications of whiffle trees, linkages, and the like, for applying compression loading forces; instead, by the present invention a bow is employed, and with floating end connections to the carrier to support the wiping element in unstressed condition, and thus for free and full conformation to or wrap of a windshield surface. Additionally, the present invention applies an automatically compensated and distributed bias to the median portions of the wiping edge wherein the compensation is established automatically by the complexity or acuteness of the instant curvature being traversed.

To assist the central biasing member to distribute its forces, a torsion-resistant spring steel back bone or interlay or insert is trapped within the carrier. This is deflectable from a planar configuration in a direction transverse to the windshield surface, but is rigid in a direction parallel to the windshield surface. Thus, the inherently resilient and pliable wiping element is supported at its ends only and is untensioned by the bow. Thus it is readily conformable to the changing curvature of the surface over which it is passing. The central portions of the carrier are so loaded by the instant curvature being traversed, through the compensating loading mechanism of the invention, including the insert, as to provide uniform wiping all the way from end to end of the wiping edge and with a unique wrap ability of a complex windshield surface. All of this through a simplified structure not heretofore known or disclosed by the prior art.

It should be pointed out that the bow is not stressed during assembly to the blade carrier, from its relaxed, free condition. Thus it does not apply to the carrier either a constantly applied or changeable tensile stress the magnitude of which varies in proportion to the degree of deflection of the carrier from its normal planar configuration by following the contours of a windshield.

In prior structure using the bow concept, the flexible wiping element flexed the tensioned carried from planar configuration and this imposed a resultant increase in the tensile stress by the bow on the carrier, because the bow was subjected to a greater deformation than from its free state to which it naturally tended to return.

By the present invention, no tensile force is exerted upon the carrier. Instead, by means of a novel float connection and a novel loading arrangement, sharper contours or curvatures are effective to relieve central bias, and thus provide improved wrap. This is distinguishable from old bow-type blades where sharper curvatures stressed the bow and in turn more sharply tensioned the carrier and thus the blade; the effect being to cause the blade to stiffen and ride the ridge instead of wrapping.

In the present invention, there is a contolled loading or reduction of loading at the center; this permits the ends to conform perfectly and the wiper blade to wrap because the bow does not increase tension on the blade, but imparts only sufficient loading at the ends and along the center to provide a perfect wrap. Thus the sharper the curve traversed by the present wiper, the lighter the cental loading. Thus the present invention provides a better conformance or wrap over curved surfaces than the prior art structures.

*The environment*

Environmental surroundings of the present invention are typified by an automobile windshield 20. However, it is to be understood that this will be used to designate the windshield of any vehicle, the windshield comprising the compound curvatures alluded to above. The windshield 20 is peripherally surrounded by rubber gasketing means, not shown, because concealed by upper and lower moldings 22 and 24.

The gasketing means mount the windshield 20 in an opening in the forward portion of the vehicle body.

The windshield wiper assembly is designated 26 and is supported by an actuator arm 28 for traversing selected portions of the windshield 20.

Concealed beneath the cowl portion 30 at the lower edge of the windshield, there is provided a windshield wiper motor structure having an exposed actuating shaft 32. To the end of the actuating shaft 32 there is suitably fitted a connector 34 that carries a pivot pin 36. The arm 28 is pivotally connected with pin 36 and therefore is free to move at its outer end toward and away from the windshield 20. A concealed spring is used to bias arm 28 and thus the wiper assembly 26 into contact with windshield 20.

It will be understood that operation of the concealed wiper motor is effective to oscillate shaft 32 and thus through connector 34 and pivot pin 36 move the arm 28 and thus wiper assembly 26 back and forth across the windshield.

*The invention*

An important component of the present invention comprises a bow 38. This is of elongated and gently curved constructional configuration and in accordance with an important aspect of the invention is made from injection molded resin. One suitable resin comprises Delrin, a DuPont trademark for an acetal resin. This is a thermoplastic material (—(—OCH$_2$—)$_n$), available as an injection molding raw material. Molded articles of this resin are characterized by high strength and stiffness combined with toughness and resilience over a wide temperature range, good dimensional stability in the presence of moisture, high heat-distortion temperature, excellent resistance to all types of organic solvents, excellent bearing characteristics, and good abrasion resistance, and is available in colors.

This material is desirable particularly because of its favorable flex characteristics in the wiper carrier, as will be described. However, the broad scope of invention is to be understood as including similar materials with analogous flexural characteristics.

From FIGURE 1, it will be noted that pivotal connections are provided at each end between the bow 38 and wiper blade carrier 39. Suffice it to say at this point that the pivotal connections at each end of the bow, with the carrier, combine to produce a floating connection or support of the carrier by the bow. Thus, during operation, the carrier can flex and conform to differing curvatures without stressing the bow. The bow is never subjected to longitudinal tensile forces by deformation of the bow from its free or unstressed condition. The bow remains in a substantially free condition at all times.

Before turning to the important pivotal end connections alluded to above, it is desirable to briefly describe the remaining components of the wiper assembly so as to provide a background for the interplay of these elements as the description progresses. Thus, the bow 38 is provided at its central portion with spaced, upstanding arms 40 that define therebetween a pin-receiving slot 42. The free end of the wiper actuating arm 28 has a pin 44, best shown in FIGURE 2, extending transversely of depending side flanges 46. This pin 44 is a snap fit in the pin-receiving slot 42 whereby an operative pivotal connection is provided between arm 28 and bow 38. It is to be understood that the pin connection is described as exemplary and that other connections with the skill of the artisan are to be embraced within the scope of invention.

It will be noted that relief notches 48 and 50 are provided on the outside of each arm 40, permitting the arms to flex and receive pin 44, carried by the end of arm 28. It will be evident that such connection provides for removal and replacement of the windshield wiper assembly as necessary.

As shown in FIGURE 3, the wiper element 52 or blade is supported by the carrier 39. Blade 52 is of elongated configuration, of wiper grade rubber, and includes a thin wiping edge 56. Centrally, the blade is widened as at 58 and between this widened portion 58 and the also wide base 60, necks down to a flex and joining portion 62.

Carrier 39 includes a body portion 64 of generally flattened, rectangular section. This has spaced rows of spaced arms 66 extending transversely away from body 64. The rows of arms 66 are spaced apart a distance to embrace base 60 of blade 52. At the tip ends, arms 66 are turned inwardly towards one another and over to embrace extending portions 68 of blade base 60 and thus retain the base. It will be understood by reference to FIGURE 10 that the blade 52 is slidably inserted between the arm sets 66 and then secured in place. Prior to inserting the blade, however, a steel insert 70 is laid into a mating groove 72, formed within body 64 of carrier 39. It will be understood that groove 72 does not extend the full length of body 64. Therefore, steel insert 70 is trapped in groove 72 when the blade 52 is inserted.

The manner in which the blade is secured in place is indicated in FIGURE 6. Inasmuch as the carrier 39 is made of thermoplastic resin, a suitable tool having opposed, movable jaws is applied to opposed arms 66 at the ends of the unit beyond the ends of groove 72. The jaws are heated; and the heat and compression of the jaws produce opposed indents 74 that force the material to flow inwardly as locking projections 76, effectively retaining blade 52 in position and locking the insert 70 of FIGURE 3 in a "home" position.

Referring back to FIGURE 3, it will be noted that the widened portion 58 of blade 52 projects each side of flex and joining portion 62 as shoulders 59. These shoulders will be noted to abut the bottom sides of inturned arms 66 on flexure of blade 52 in the arrow 73 direction when the blade is moved back and forth over a windshield surface. Thus, the amount of flexure is limited or properly controlled so as to present an edge 80 to the windshield surface in wiping relationship with either direction of movement.

Referring to FIGURES 3, 4 and 1, it will be noted that the arms 66 are spaced along the length of carrier 39 with spaces 82 therebetween. As shown in FIGURE 4, die relief openings 84 permit formation of the upturned portions of arms 66 and subsequent withdrawal of the die projections.

The inner end bow-carrier connection

Referring to FIGURE 5, it will be noted that the inner end connection between the bow 28 and carrier 39 takes the form of a single pin hinge or pivot. Thus, the inner terminal end of bow 28 is formed as a transversely extending cylindrical, solid pin 86. As shown in FIGURE 8, a locking tab 88 extends beyond the periphery of pin 86. This drops into a slot 90 formed in the inner shoulder portion 92 of carrier 39. The outer shoulder portion 94 cooperates with shoulder portion 92 and the body of carrier 39 to form a semi-circular or semi-cylindrical recess 96, to receive and trap the pin end portion 86. Note that the manner of insertion of the pin end is to place the bow 28 with shoulder 98 back against the free end of outer shoulder portion 94 so that lock tab 88 clears the inner free edge of shoulder portion 92. This permits the pin end to be slid into the "home" position, and then when the bow 38 is moved clockwise, lock tab 88 drops into slot 90, as indicated in FIGURE 8, locking the bow 38 and carrier 39 against transverse movement relative to one another; but permitting pivotal action during operation of the wiper.

FIGURE 7 also shows the manner in which the locking tab 88 cooperates with the slot 90, providing an operable connection between bow 28 and carrier 39.

The outboard double hinge connection between bow and carrier

Referring to FIGURE 9, it will be noted that the outer ends of the bow and carrier are provided with a double pin link-hinge connection, permitting float between the bow and carrier so that when the carrier traverses a sharp curve the bow will not be stressed by the curving or curvature of the carrier. The advantage of this has been brought out above, wherein it was stated that better wrap of sharp curves is provided where the wiping edge remains unstressed or untensioned in longitudinal direction. In prior constructions where there was a single pin hinge between each end of the bow and carrier, the carrier became stressed by the bow when the bow was stressed for assembly. When this type of construction is used, the stress of both carrier and bow increases in proportion to the degree of deflection of the carrier from its normal planar configuration. Thus, the sharper the curve, the more the bow stresses and stiffens the carrier to force the blade to ride the ridge instead of wrapping the curvature.

In the present invention, there is no such tensioning or stiffening because the outer end now to be described provides a floating connection between the bow and carrier. As will be brought forth later, this floating connection between bow and carrier cooperates with a central compensating loading member that adjusts the load applied to the central portion of the carrier inversely as the sharpness of contour of instantly wiped surface increases. Actually, this amounts to a controlled reduction of loading at the central portion of the carrier, permitting free wrap of the blade at the ends, over sharp curves.

To continue, the outer end of bow 28 is provided with an inner shoulder 100 and an outer shoulder 102. These define a semi-cylindrical recess 104. Similarly, the outer end of carrier 39 is provided with an inner shoulder 106 and an outer shoulder 108 between which there is defined an elongated recess 110 of semi-cylindrical configuration.

As shown in FIGURE 10, the outer shoulder 102 of arm 28 is provided with a central notch 112. Also, the outer shoulder 108 of carrier 39 is provided with a central notch 114, the purpose of notches 112 and 114 become apparent. These notches are also shown in the section view of FIGURE 11.

The double pin link-hinge member is shown in FIGURES 12 and 13, per se; and in operable combination with the ends of the bow and carrier in FIGURES 9, 10 and 11. First, to describe the double pin link member itself, note in FIGURES 12 and 13 that the central body portion 116 is of generally plate-like configuration, with upper and lower, solid, cylindrical pin ends 118. As shown in FIGURE 13, one face of body 116 is provided with an integral rib 120 that follows the contour of side view profile of body 116 and pin ends 118 and these extend to the major diameters of the pin ends 118. This provides locking tabs 122 at each end that cooperate with notches 112 and 114 as indicated in FIGURE 10.

Referring back now to FIGURES 9, 10 and 11, it will be understood that a flexible or floating connection is thus established between the outer ends of the bow 28 and carrier 39 so that the bow and carrier remain unstressed relative to one another at all times. Note in FIGURE 11 that while a transverse, operative lock is provided between the link member 115 and the bow and carrier, the ends of tabs 122 are free of abutting relationship with the bottoms of slots 112 and 114, so that within maximum operational limits, bow 28 and carrier 39 can flex easily and freely relative to one another.

From the foregoing, it will be obvious that there is an operable, but unstressed connection between the bow and carrier; and thus, they can float relative to one another. It will be understood that as the carrier flexes over an increasingly sharper curved surface, its chordal length will shorten. There is however, no consequent shortening of the bow because the double pin end link 115 automatically compensates so that the two units, bow and carrier though of instant differing lengths, nevertheless are operably connected but remain unstressed relative to one another. Thus, these elements operate independently in a manner of speaking.

The central automatically compensating loading mechanism

This important feature of the invention is shown in FIGURES 14–16, inclusive. Briefly, the mechanism comprises a tension spring cooperating with a hinging member in a manner such that when the hinging member is essentially straightened out in configuration, a resultant force transmitted by the spring, through the hinging member to the wiping rubber, is fairly substantial. This is the condition of parts with wiper traversing a relatively flat surface. However, when the wiper traverses a more sharply curving surface, it will be understood that the ends of the bow embrace such surface in a manner to cause the carrier and wiper rubber to develop a convex outer curvature and snug up to the inside of the bow and thus collapse the hinge member. The effect of this is to automatically transmit spring force into the hinge with resultant diminished force into the wiping rubber along the central area thereof. The better wrap over the more sharply convex surfaces previously alluded to is thereby provided.

Now to continue, note FIGURE 15 for a description of the central hinging member. This comprises an elongated body member 124, having three (3) hinge restrictions or points 126, 128 and 130 formed therein. At the top end, the top tab portion 132 is provided with an aperture 134 as in FIGURE 15a. This is fitted over tab member 136 extending downwardly from the bottom of the bow and suitably molded integrally therewith. Tab 136 is apertured at 138 at its bottom end to receive the hook end 140 of a spring 142. It will be understood that the hook end is effective to hold tab member 136 in place. By reference to FIGURE 15, it will be noted that second tab portion 144 is of arm-like structure having an elbow-like curve 146 intermediate its ends whereby it can cradle or snug upwardly into the similarly shaped contour on the bottom side of bow 38. This subtlety will manifest itself, as the description progresses, in the form of a force absorbing mechanism, effective to nullify the force of the spring 142 in over-center positions of arm member 124.

At the central hinge restriction 128, there is provided an aperture to receive the other hook end 148 of spring 142. Next adjacent the second tab portion 144 is a third tab portion 150; and next adjacent the third tab portion 150, being separated by the hinge restriction 130 in the fourth tab portion 152. The manner in which the tab portion 152 is operably connected to the bow 38 is indicated in FIGURE 15b. As there shown, the body 64 of carrier 39 has an integral projection or rivet stud 154 that is inserted through a hole 156 in fourth tab portion 152. The rivet stud is of thermoplastic material and is headed over as indicated in FIGURE 15b to provide an operable joinder between fourth tab portion 152 and body 64 of carrier 39.

The resultant forces involved during operation of the wiper

First, let us refer to FIGURE 15 for a disclosure of how the maximum force is imposed upon the wiping edge 80 when the blade 52 is traversing flatter or curved surfaces of a low degree of curvature. As shown in FIGURE 15, body portion 124 as regards second tab 144 and third tab 150 is substantially straightened out and thus the bias of spring 142 is downwardly in the arrow direction 158. The modest degree of curvature, or the substantial absence of curvature in this position of the wiper is indicated by the diverging arrows 160. The resultant force is at a maximum.

By referring to FIGURE 16, a curve of sharper convexity is illustrated by the arrows 162. It will be noted that spring 142 is approximately horizontal so that a portion of its force is moved or balanced by being absorbed by top tab portion 132, e.g., the bow 28. This is indicated by arrow 164. It will be understood that this condition substantially reduces the amount of resultant force going into the carrier 39 and thus into the blade 52. The arrow 166 indicates a portion of the force of spring 142 as being directed through third tab portion 150 and into the carrier and wiper. The resultant force, as indicated by arrow 168, and by comparison with that of FIGURE 15, will be understood to be of an intermediate or lesser degree than the maximum resultant force indicated by the arrow 158 of FIGURE 15.

Let us now refer to the solid portion of FIGURE 14 wherein the sharpest curvature condition, as at the outer end of the wiper on a curved windshield, produces a zero resultant force by neutralization of the tension of spring 142. As there shown by the arrow 170, there is no resultant force, or substantially none. This is due to the fact that the second tab portion 144 is cradled up against the inside of the elbow curve of bow 38 and thus the spring force is absorbed substantially completely by the bow. The absence of resultant force on the carrier is indicated by the horizontal direction of arrow 170, showing that the force is directed into the bow 38, nullifying any resultant force.

Summary

From the foregoing, it will be understood that a generally straight condition of the wiper blade will result in maximum application of force to the central portions of the wiping edge. To provide improved wrap over more sharply curving surfaces, the central force is diminished commensurate with the degree of curvature, providing automatic and perfect wrap based exactly upon the degree of sharpness of curvature being traversed.

Extended scope of invention and materials of construction

Materials from which the bow and hinge member 115 and the carrier 39 are fabricated are preferably synthetic resins. A selected member of this group of materials is Delrin acetal resin, a trademark of the DuPont Company as mentioned above. Although this material is desirable from an economical, mass production point of view for making bow 38, it is not absolutely required. As pointed out above, the present invention utilizes a bow that is neither stressed nor required to flex during operation. Therefore, since no flexibility is required, die cast metals and the like can be utilized. In the case of carrier 39, however, flexibility is required and Delrin asserts itself as an ideal material for this application.

The hinging member 124 is preferably made of polypropylene, an ideal material for this application. It is ideal in that hinge portions formed integrally therein will withstand millions of flexures without failure and actually grow in strength during early life with accumulating flexures thereon. It is to be understood, however, that other materials of analogous characteristics will fall within the scope of invention. Further, a multi-piece hinge unit at this point is to be considered within the scope of invention, though less desirable from a cost point of view, as will be obvious.

Of course, the wiping edge 52 will be made of a good grade of wiper rubber as currently known.

The extended scope of invention would also include a configuration of parts where the central hinge point of the hinging member 124 can be located at any point between the end hinge areas 126 and 130, as shown in FIGURES 14–16, inclusive.

The spring 142 also can be connected to the hinge point as displaced any place along the length, or other than the hinge point and still render a satisfactory job in many instances.

FIGURES 14–16, inclusive, have shown one end of the spring connected to the tab 136, projecting downwardly from the bow. However, the extended scope of invention would include a connection between this end of the spring and some point on the area 39 so that in over-center position of the hinge member 124, the effect of the spring can still be substantially nullified.

The present invention has been described relative to a bow-type windshield wiper having a floating connection between the carrier and bow. However, the extended scope of invention would include application of the central loading member to the old type bows to better assist them in wiping flat surfaces.

The invention is also applicable to the wiping of flat windshields as will be obvious to those skilled in the art.

The steel insert has been broadly alluded to above. It is to be understood that this member can be tapered along its length to provide a tailor-made application of pressure for especially difficult or sharp curvatures and thus can be, so-to-speak, tailor made for a specific job.

*Advantages of the present invention*

Advantages of the present invention are believed to be self-evident from the foregoing description. However, these will be briefly reiterated here to highlight the invention, as regards the more pronounced distinctions and improvements provided to the art by the present invention. These are as follows:

(1) An important advantage is the combination of the carrier and blade floating relative to the bow to provide perfect wrap over sharply curving surfaces. This, without stressing either the bow or the carrier or the blade longitudinally, in the process of such perfect wrapping.

(2) A unique, automatically compensating loading mechanism for the central portion of the wiper blade, working with a longitudinally extending rib to distribute compression forces all along the length of the blade. Further, by automatically reducing the loading force as the curvature increases, the full degree of wrap by the unstressed bow and wiper blade is sustained, providing full wrap and effective wipe over the entire windshield surface. Further, it should be reiterated that the maximum loading at the central portion of the wiping edge is applied when the wiping edge is in a generally flattened condition; this produces an equivalent loading over the entire length of the blade that is generally equivalent to that produced when the blade is wrapping a sharp curving surface, where the wrap of the rubber imparts an overall length loading even with reduced loading at the center.

(3) A structure of simplified manufacture and minimum number of parts, namely: (*a*) bow; (*b*) carrier-wiper blade; and (*c*) intermediate hinging or loading structure of automatically compensating loading magnitude.

(4) A windshield wiper construction that is made entirely in its basic parts of bow, carrier and interconnections of injection molded synthetic resin for durability, anti-corrosion characteristics, self-lubrication joint properties at pivots; and absence of maintenance, even in a product that is economical to manufacture on a mass production basis.

I claim:

1. In a windshield wiper,
an elongated bow having ends,
an elongated carrier of substantially the length of said bow and also having ends, said carrier having a sectional configuration of width greater than thickness, and being relatively stiff in directions transversely of its width and relatively flexible in directions transversely of its thickness,
a pivotal connection between one end of said bow and one end of said carrier,
pivotal connecting means at the other end of said bow and carrier,
a link having ends operably connected to said pivotal connecting means at said other end whereby the central portion of said carrier is free to move toward and away from said bow without imparting stress to said bow, and the carrier is non-rotatable relative to said bow,
an elongated wiper blade supported by and extending along the length of said carrier for transverse movement over a windshield surface,
and means operative between said bow and carrier to urge the central portion of said carrier away from said bow with a force inversely proportional to the degree of curvature imparted to said carrier by said wiper blade traversing a curved surface.

2. In a mechanical assemblage,
an elongated bow having spaced ends,
an elongated carrier of approximately the length of said bow and also having spaced ends,
said carrier having a sectional configuration of width greater than thickness and being relatively rigid in directions transverse to the width and relatively flexible in directions transverse to the thickness,
a transverse pin on one end of said bow,
a transverse pin socket on one end of said carrier and receiving said bow pin,
means on said pin and socket locking said parts against transverse shifting relative to one another but permitting pivotal movement between said one end of said bow and carrier,
a transverse pin socket on each of the other ends of said bow and carrier,
a link having spaced ends with parallel pins on said ends and said pins operably received within said pin sockets of said bow and carrier,
means locking said pins against transverse movement within said sockets and permitting link-bow and link-carrier pivoting movement,
a wiper blade supported by said carrier for movement over a windshield surface,
and means operative between said bow and carrier urging the central portion of said carrier away from said bow with force inversely proportional to the degree of curvature imparted to said carrier by said wiper blade traversing a curved surface.

3. In a windshield wiper,
an elongated bow having spaced ends,
an elongated carrier having spaced ends, means operably connecting the ends of said bow with the ends of said carrier whereby the central portions of said carrier are free to move toward and away from said bow without stressing said bow, and the carrier being held against rotation, a wiper blade supported by said carrier for movement over a windshield surface, an elongated hinge arm having spaced ends, means pivotally connecting said ends respectively to said bow and to said carrier at central portions thereof, said hinge arm having a median hinge point, and biasing means connected between said median hinge point and one of said ends, urging said hinge point in a direction tending to straighten said hinge arm.

4. In a windshield wiper, an elongated bow having spaced ends, an elongated carrier of approximately the length of said bow and also having spaced ends, said carrier having a cross sectional configuration of width greater than length and being relatively rigid in directions transverse to the width and relatively flexible in directions transverse to the thickness, means pivotally connecting the ends of said bow with the ends of said carrier whereby the central portions of said carrier are free to move toward and away from said bow without stressing said bow, and said carrier being held against rotation, a wiper blade supported by said carrier for movement over a windshield surface, a hinge arm having spaced ends, means pivotally connecting said ends respectively to said bow and to said carrier at points intermediate the ends of said bow and carrier, said hinge arm having a median hinge point, and means urging said hinge point toward one of said ends of said hinge arm, tending to straighten said hinge arm, and urge said carrier away from said bow.

5. In a windshield wiper, an elongated bow having spaced ends, an elongated carrier of the approximate length of said bow and also having spaced ends, said carrier having a cross sectional configuration of width relatively greater than length and being relatively rigid in directions transverse to the width and relatively flexible in directions transverse to the thickness, means pivotally connecting the ends of said bow with the ends of said carrier whereby the central portions of said carrier are free to move toward and away from said bow without stressing said bow, and said carrier being held against rotation, a wiper blade supported by said carrier for movement over a windshield surface, a flexible arm having spaced ends, means pivotally connecting said ends respectively to said bow and to said carrier at points intermediate the ends of said bow and carrier, said flexible arm being movable between substantially straight and over-center bent conditions, means urging said arm toward a straight condition to force said carrier away from said bow, and said urging means being rendered substantially ineffective by the over-center condition of said arm.

6. In a windshield wiper, an elongated bow having spaced ends, and elongated carrier of the approximate length of said bow and also having spaced ends, said carrier having a cross sectional configuration of width greater than length and being relatively stiff in directions transverse to the width and relatively flexible in directions transverse to the thickness, means pivotally connecting the ends of said bow with the ends of said carrier whereby the central portions of said carrier are free to move toward and away from said bow without stressing said bow, and said carrier being held against rotation, a wiper blade supported by said carrier for movement over a windshield surface, a hinge arm having spaced ends and an intermediate hinge point, means pivotally connecting said ends respectively to said bow and to said carrier at points intermediate the ends of said bow and carrier, a spring having spaced ends, means operably connecting one of the spring ends to said median hinge point and the other end to one of said bow and carrier adjacent an end of said hinge arm, and said spring being of a length to be at least slightly stressed in any position of said arm.

7. In a windshield wiper, and elongated bow having spaced ends, an elongated carrier having spaced ends, said carrier being of approximately the same length as said bow and having a cross sectional configuration of width greater than thickness and being relatively rigid in directions transverse to the width and relatively flexible in directions transverse to the thickness, means connecting the ends of said bow with the ends of said carrier whereby the central portion of said carrier can move freely toward and away from said bow, and said carrier being held against rotation, a wiper blade supported by said carrier for movement over a windshield surface, a hinge arm having spaced ends and a hinge joint interemediate said ends, means pivotally connecting said ends of said arm respectively to said bow and to said carrier at points intermediate the ends of said bow and carrier, spring means connected between said hinge point of said arm and one of said bow and carrier adjacent one of said end connections and being effective to bias said arm toward a straight condition to urge said carrier away from said bow, and said hinge arm being movable between a straight condition and a condition bent over-center wherein said spring means is rendered substantially ineffective, the effect of said combination being to urge said bow and carrier apart with a force inversely proportional to the nearness of the central portions of said bow and carrier relative to one another.

8. In a windshield wiper, an elongated bow having spaced ends, an elongated carrier having the approximate length of said bow and also having spaced ends, said carrier being of rectangular sectional configuration with width relatively greater than thickness and being relatively rigid in directions transverse to the width and relatively flexible in directions transverse to the thickness, a transverse pin on one end of said bow, a transverse pin socket on one end of said carrier and receiving said bow pin, means on one of said pin and socket locking said parts against transverse shifting movement relative to one another but permitting free pivotal movement between said bow and said carrier, a transverse pin socket on each of the other ends of said bow and carrier, link means having spaced parallel pivot pins and said pins being operably received within said pin sockets of said bow and carrier, means locking said pins against transverse movement within said sockets and permitting link-bow and link-carrier pivotal movement, an elongated wiper blade supported by and extending along the length of said carrier for transverse movement over a windshield surface, a flexible arm having spaced ends, means pivotally connecting said ends respectively to said bow and to said carrier at points intermediate the ends of said bow and carrier.

said arm being movable between a generally straight condition and a condition bent over-center, means urging said arm toward a straight condition to force said carrier away from said bow, and said urging means being rendered substantially ineffective by the over-center condition of said arm.

9. In a windshield wiper, an elongated bow having spaced ends, an elongated carrier having a length approximately equivalent to that of said bow and also having spaced ends, said carrier being of rectangular configuration and of a width relatively greater than thickness and being relatively rigid in directions transverse to the width and relatively flexible in directions transverse to the thickness, transverse pin means on one end of said bow, transverse pin-receiving socket means on one end of said carrier and operably receiving said pin means, means on one of said pin and socket means effective to restrain said parts against transverse shifting relative to one another, but permitting free pivotal movement between said bow and carrier, transverse pin socket means on each of the other ends of said bow and carrier, link means having spaced pivot pin means and said pin means being operably received within said pin socket means of said bow and carrier, means locking said pivot pin means against transverse movement within said sockets but permitting link-bow and link-carrier pivotal movement, an elongated wiper blade supported by and extending along the length of said carrier for transverse movement over a windshield surface, a hinge arm having spaced ends and a hinge joint intermediate said ends, means pivotally connecting said ends of said arm respectively to said bow and to said carrier at points intermediate the ends of said bow and carrier, spring means connected between said hinge point of said arm and one of said bow and carrier adjacent one of said end connections and being effective to bias said arm toward a straightened condition to urge said carrier away from said bow, and said hinge arm being movable between a generally straight condition and an over-center bent condition wherein said spring means is rendered substantially ineffective, the effect of said combination being to urge said bow and said carrier apart with a force inversely proportional to the nearness of the central portions of said bow and said carrier relative to one another.

10. In a windshield wiper, an elongated bow having spaced ends, an elongated carrier of approximately the length of said bow and also having spaced ends, said carrier being of generally rectangular section and flexible transversely of its thickness but relatively rigid transversely of its width, means operably connecting the ends of said bow with the ends of said carrier whereby the central portions of said carrier are free to move transversely relative to said bow without imparting stress to said bow, and said carrier being non-rotatable, a stiffening member carried longitudinally by said carrier to distribute applied loading forces therealong, a wiper supported by said carrier for movement over a windshield surface, and means operative between said bow and said carrier to urge the central portions of said carrier away from said bow with force inversely proportional to the degree of curvature imparted to the carrier by said wiper blade traversing a curved surface.

References Cited by the Examiner

UNITED STATES PATENTS

| 2,254,343 | 9/41 | Zierer | 15—250.23 |
| 2,772,436 | 12/56 | Deibel | 15—250.42 |
| 2,780,824 | 2/57 | Scinta et al. | 15—250.42 |
| 3,089,175 | 5/63 | Hinder | 15—250.36 |

FOREIGN PATENTS

| 1,033,521 | 4/53 | France. |
| 1,090,122 | 9/60 | Germany. |

CHARLES A. WILLMUTH, *Primary Examiner.*